United States Patent [19]

van der Eerden

[11] Patent Number: 4,651,383

[45] Date of Patent: Mar. 24, 1987

[54] DEVICE FOR CUTTING OFF THE WINGS OF SLAUGHTERED POULTRY

[75] Inventor: Henricus F. J. M. van der Eerden, Boxtel, Netherlands

[73] Assignee: Stork PMT B.V., An Boxmeer, Netherlands

[21] Appl. No.: 720,676

[22] Filed: Apr. 8, 1985

[30] Foreign Application Priority Data

Apr. 9, 1984 [NL] Netherlands ............................ 8401121

[51] Int. Cl.⁴ ............................................... A22C 21/00
[52] U.S. Cl. ............................................. 17/11; 17/12
[58] Field of Search ........................... 17/11, 57, 61, 12

[56] References Cited

U.S. PATENT DOCUMENTS

| 3,417,424 | 12/1968 | Chamberlain | 17/11 |
| 3,639,945 | 2/1972 | Duncan et al. | 17/52 X |
| 3,943,600 | 3/1976 | Cramer | 17/11 B |
| 4,019,223 | 4/1977 | Baker | 17/11 B |

FOREIGN PATENT DOCUMENTS

WO84/01692  5/1984  World Int'l Appl .................. 17/11

Primary Examiner—Willie G. Abercrombie
Attorney, Agent, or Firm—Newton, Hopkins & Ormsby

[57] ABSTRACT

Device for separating the wings from the trunk of slaughtered poultry hanging by the legs on a conveyor track, comprising two cutting knives attached to a carrier which is rotatably driven in the conveying device, means for positioning the poultry between the cutting knives and a wing support for each knife which cooperates with the latter and intersects the path of the knife.

8 Claims, 6 Drawing Figures

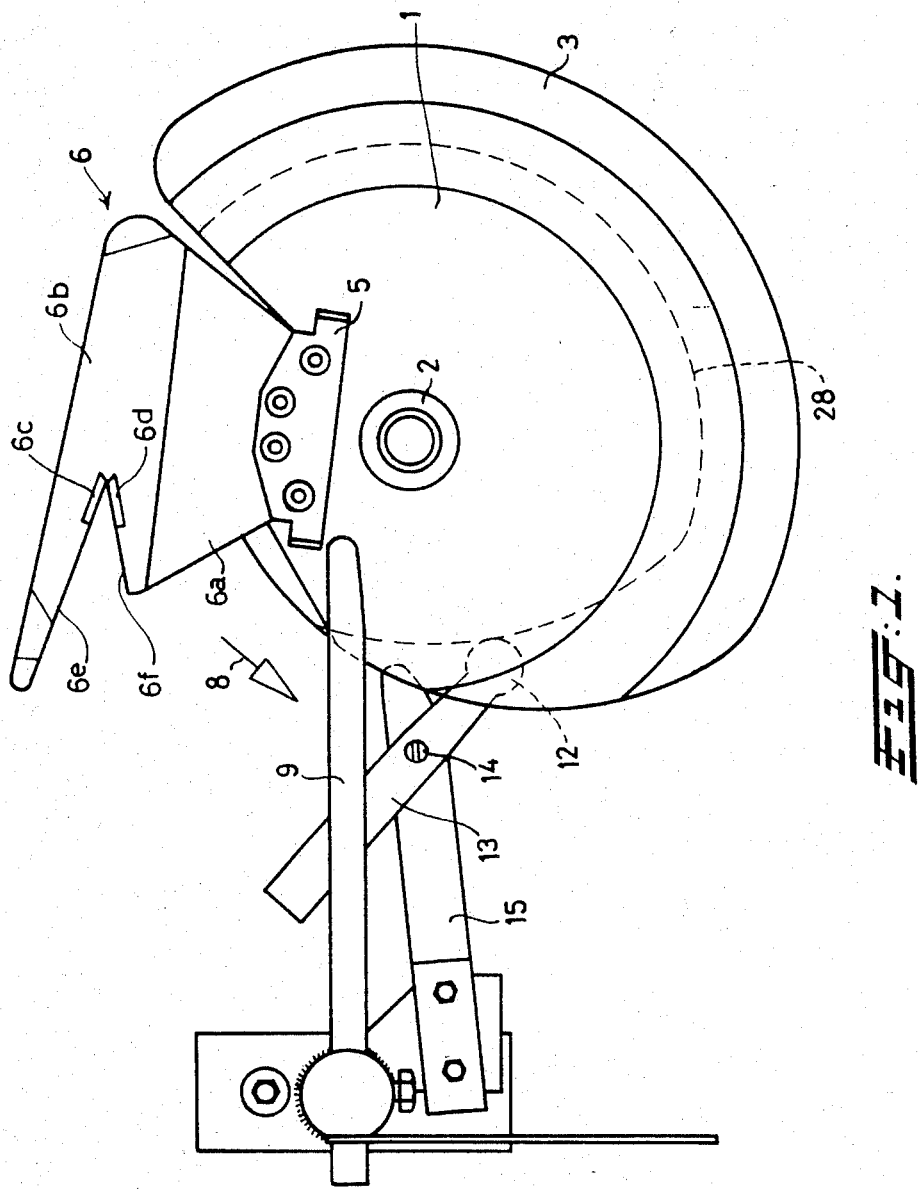

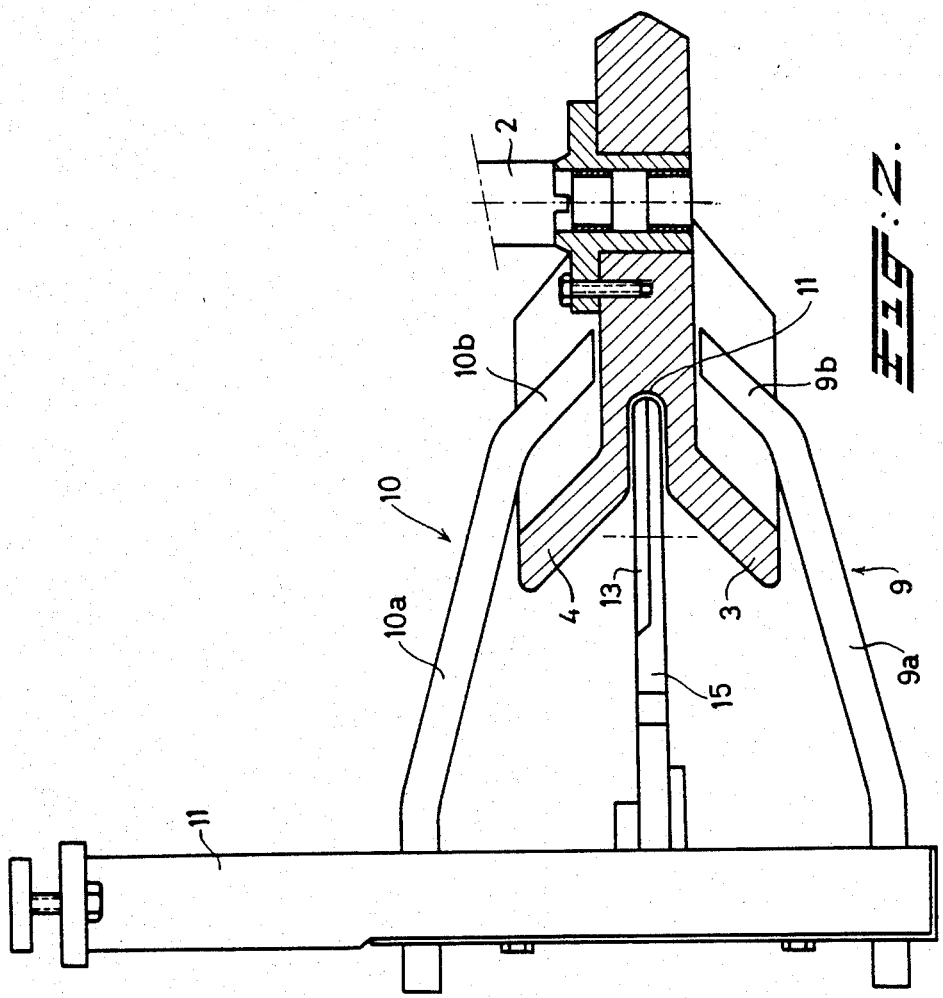

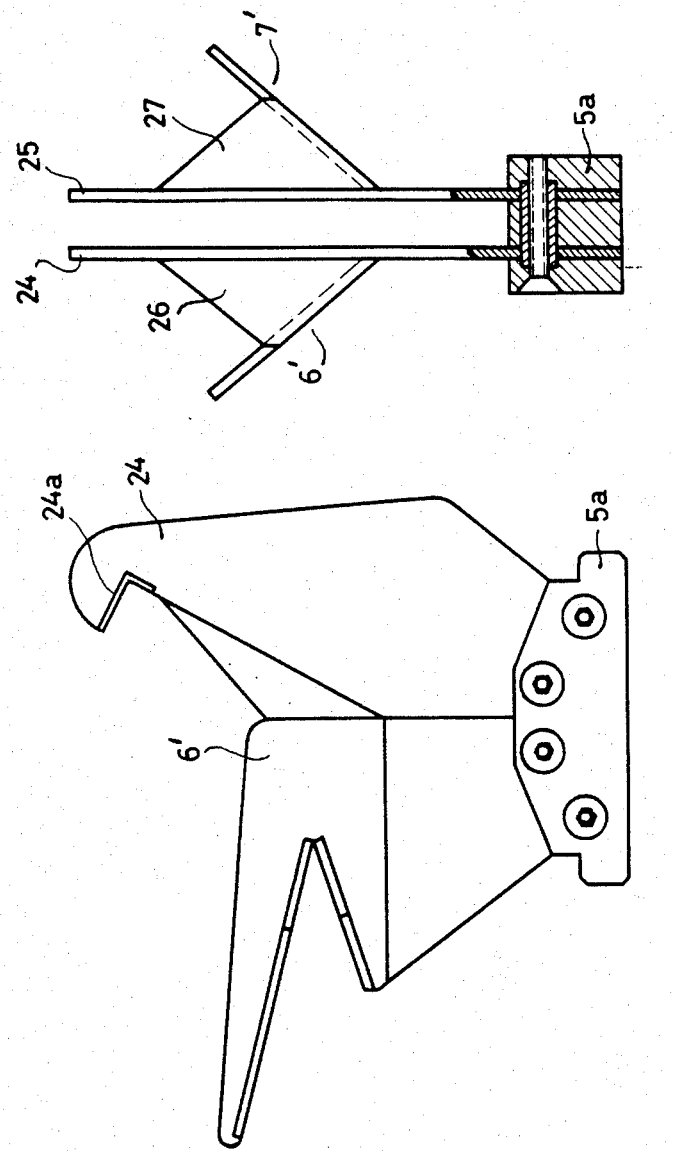

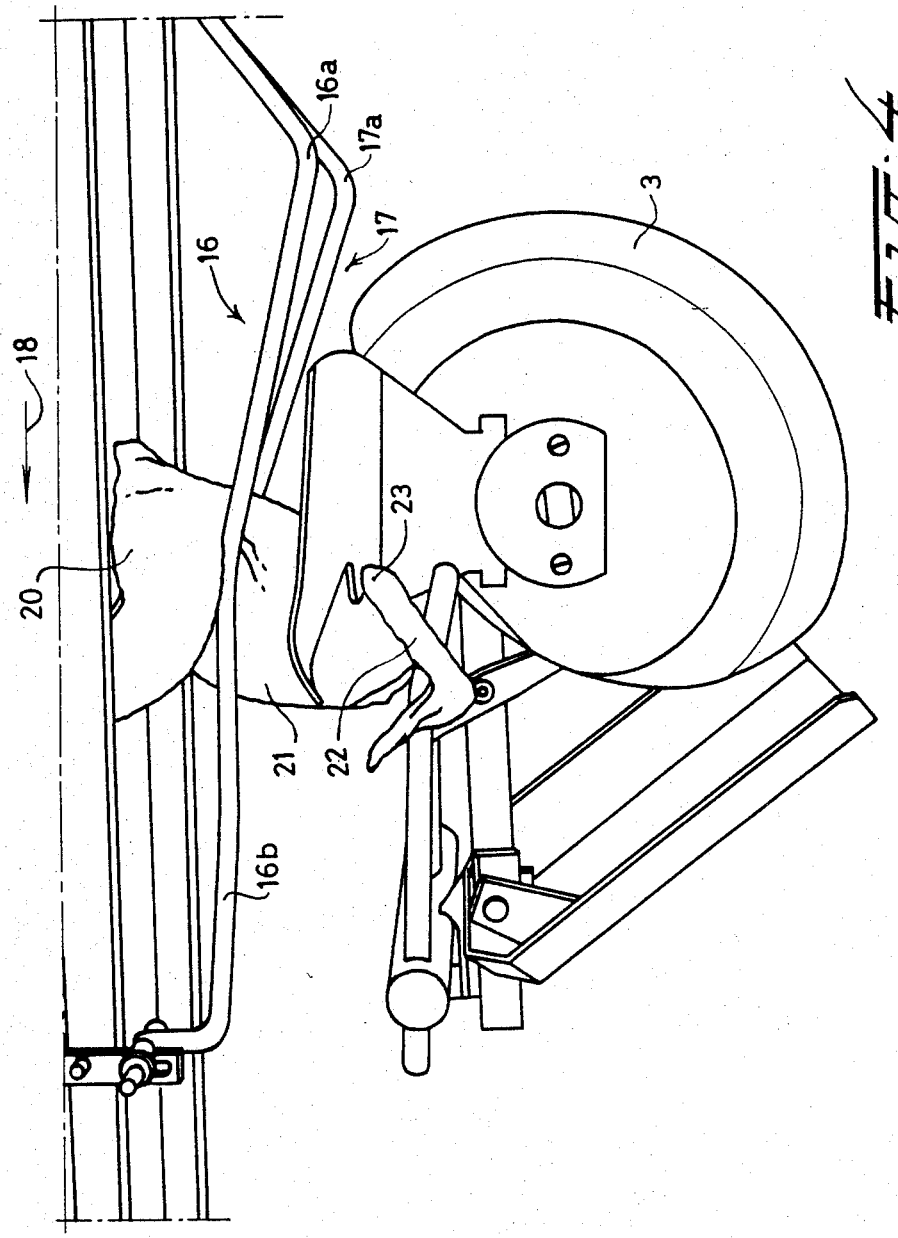

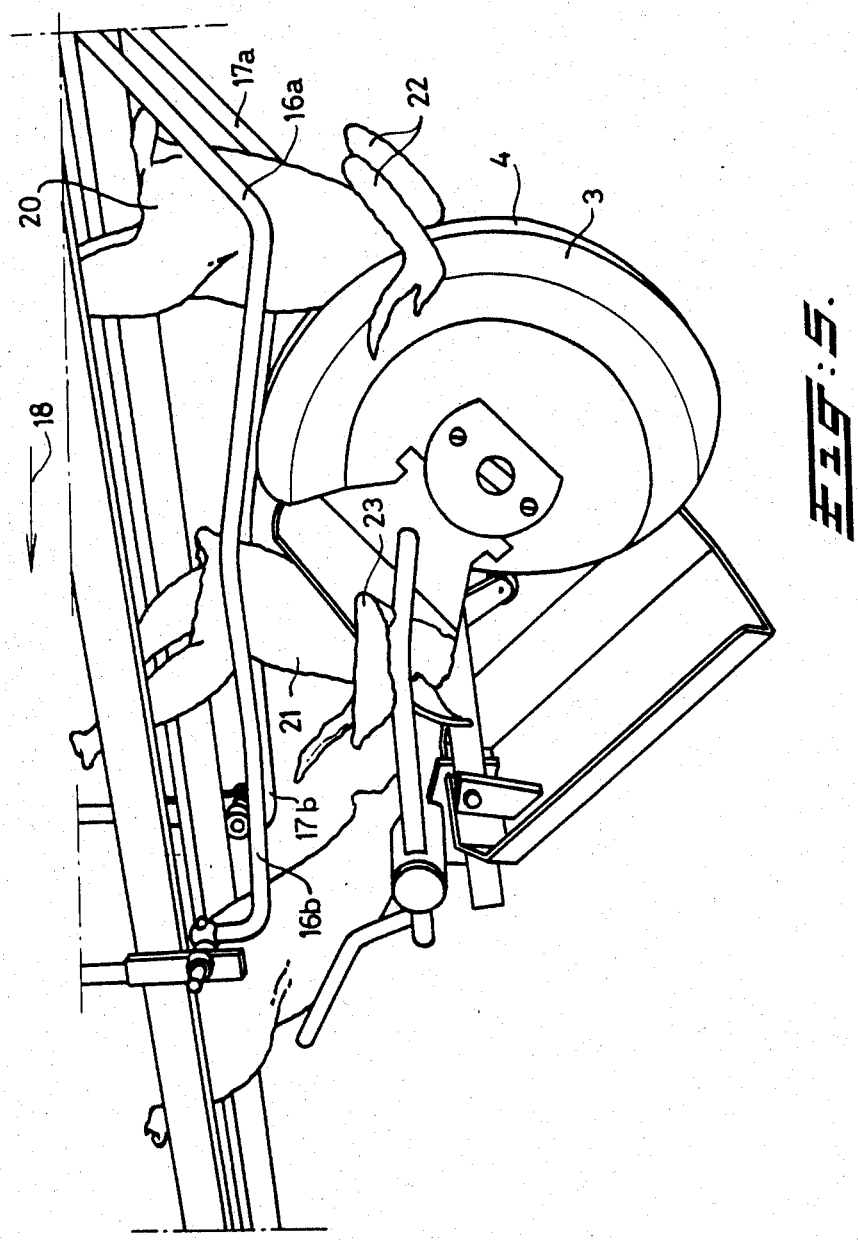

DEVICE FOR CUTTING OFF THE WINGS OF SLAUGHTERED POULTRY

BACKGROUND OF THE INVENTION

The invention relates to a device for separating the wings from the trunk of slaughtered poultry hanging by the legs on a conveyor track and being conveyed with the breast forward.

It is known that poultry portions frequently fetch a higher price per unit of weight than whole birds; bird portions of this type are increasingly in demand as a result of the increase in the number of relatively small households and the use of grilled or roasted bird portions as a snack. Consequently, a number of devices have already been developed, by means of which birds can be divided into portions (breast portions, back portions, legs, etc.).

Within this context there is a need for a device by means of which the wings can be separated from the trunk reliably and correctly at the shoulder joint.

SUMMARY OF THE INVENTION

The invention provides a device of this type which is characterized, according to the invention, by two non-circular knives oppositely attached to each side of a rotatably driven common carrier, of which the rotating plane coincides with the plane of symmetry of the conveyor incorporating means to position poultry between the knives and by a wing support on each side of the carrier cooperating with each knife during the cutting operation.

The poultry is conveyed breastforward towards the device and is pulled over the carrier to the other side for the cutting operation. The knives moving in the conveying direction of the poultry during part of their rotational movement, then overtake the bird, so to speak, penetrate into the V-shaped space between wing and body from the back side and subsequently sever the joint at the correct position. A reliable operation is obtained with a simple construction.

The knives are attached to the carrier adjacent to the diverging flanges, with the knife planes essentially forming an extension of the flanges of the carrier. Knife planes and flanges thus form the positioning means for the poultry, orienting the poultry symmetrically with respect to the knives. Rotation of the common carrier disc and conveying movement of the poultry are coordinated so that the poultry after being pulled over the carrier are positioned in the non-flanged section of the carrier.

The device is preferably provided with a stop positioned downstream and set up in the central longitudinal plane between the knives. This stop can be elongate and tiltable about a horizontal axis, one end located under the axis of rotation cooperating with a control curve attached to the carrier. As a result of this, the bird's body can be held back until the instance at which the cutting knives are pressed through between the wing shoulder joints and the wings are separated.

In an advantageous embodiment of the wing support means, these are formed by elongate guides whose ends are directed towards one another and which grip around the edge flanges. Preferably each knife is provided with two cutting edges having a V-shaped configuration and each preceded by a non-cutting inlet edge part, the plane of which essentially forming an extension of the flanges of the carrier. This measure ensures that the cut is always made at the correct position since the inlet edge parts position the bird's body relative to the cutting edges following the inlet edge parts during the rotary movement of the carrier. These lastmentioned cutting edges are preferably formed in a knife part diverging towards the outside.

In certain cases it is desired that, for the benefit of following divisioning of the poultry, two incisions be made parallel to and on either side of the backbone. This is the case for example when so-called "breast portion parts having long ribs" are desired during the subsequent cutting up of the bird, which on removal of the breast fillet parts result in larger fillets. Incisions of this type can be made during the operation of separating the wings by using two additional cutting knives situated behind the wingcutting knives as seen in the direction of rotation, each having a hook-shaped cutting edge, the open part of which is directed in the direction of movement.

It has been found in practice that the device according to the invention not only makes possible accurate and reliable cutting through the shoulder joint of the wing but also that with this method less meat is cut off the breast portion so that the latter represents a higher value.

DESCRIPTION OF THE DRAWINGS

FIG. 1 is a side view of an embodiment according to the invention;

FIG. 2 is a top view of this embodiment (the cutting knives being omitted);

FIG. 3a is a side view of the cutting knives, in combination with back-cutting knives, used in this embodiment;

FIG. 3b is a side view of these knives;

FIG. 4 is a perspective view of the device according to the invention;

FIG. 5 is a further perspective view of this device.

DESCRIPTION OF A PREFERRED EMBODIMENT

The embodiment shown in the figures comprises a disc-shaped knifecarrier 1, preferably made of plastic, which is driven rotatably about axis 2 and is provided over part of its circumference with diverging flanges 3, 4. An insert piece 5, having two cutting knives 6, is fixed in the disc. Only one cutting knife 6 is illustrated in FIG. 1 because the second knife is a mirror image of the first knife having identical structural elements and being attached in corresponding fashion to diverging flange 4. Each knife 6 consists of a part 6a standing transversely on the axis and of a part 6b, standing at an angle thereto. The parts 6b of each knife 6 form two diverging planes, which essentially are extensions of the diverging flanges 3 and 4 of the carrier. The parts 6b are divergently formed and have two cutting edges 6c and 6d respectively coming together in the closed end of the fork and have non-cutting guiding edges 6e and 6f respectively extending towards the open ends of the fork.

The disc is rotatably driven in the direction of arrow 8 via the axis 2 and both the flanges 3, 4 and the knives 6 move during this rotation between two wing support rods 9, 10 which are taken up in a holiday device 11. Each support rod 9, 10 has a first part 9a, 10a directed with a relatively small angle towards the side plane of the disc-shaped carrier 1 and a second end part 9b, 10b respectively which is directed at a blunter angle and towards ending close to the disc side plane.

In the embodiment shown, a guide curve 28 is formed in the central circumferential surface of the disc (shown with dotted lines in FIG. 1), this curve cooperating with roller 12 which is located at the lower end of an elongate stop 13 which is capable of tilting about the support rod 15 via an axis of rotation 14. This tiltable stop can also be replaced by a fixed stop and is of particular advantage when during separation of the wings at the same time incisions are formed in the back, as will be described below.

Above the abovementioned elements are located two thigh guide rods 16, 17 each consisting of feed parts 16a, 17a slightly sloping and converging in the conveying direction of the poultry (indicated by arrow 18) followed by diverging outlet part 16b and 17b, as illustrated in FIG. 5.

The device operates as follows:

The bird 20, hanging by the legs on a suitable conveyor track, arrives with its breast 21 in the positioning groove between flanges 3, 4 at the flange ends adjacent to the knives 6.

During its forward conveying movement, the bird is guided through the groove formed by the diverging flanges of the carrier disc and subsequently attains a position in which it rests with its back against the non-flanged part of the carrier disc.

When the knives reach the bird, the latter always has the position shown in FIG. 4.

During this procedure, the wings 22, projecting sideways from the body, come to rest with their central joint 23 above the support rods 9, 10 and the wings are cut off through the shoulder joints by the cutting edges 6c and 6d respectively, of each rotating knife 6, approaching the bird from the backside. The shoulder joints are well positioned relative to the cutting edges by the non-cutting positioning edges 6e and 6f respectively. The trunk portions without the wings can then be transported to another device downstream from the wing-cutting device or can be removed directly from the device.

It is important that, when the cutting knives 6 are near the uppermost position, the cooperation between the control curve 28 and the roller 12 raises the elongate stop 13 and keeps the bird back, which then exerts a halting action on the breast to keep the back of the bird in contact with the non-flanged part of the carrier disc in order to safeguard the correct positioning of the bird on the incoming knives; during further rotation of the disc the curve part 28 located radially more inwardly becomes operative and can tilt away the stop after the wings have been cut off.

Within the scope of the invention different modifications are however possible.

It is also possible to use a knife carrier having two additional knives by means of which two parallel cuts can be made at the same time in the back of the bird during the cutting-off operation of the wings, this being desirable for certain subsequent dividing-up procedures for example when breast portions having so-called "long ribs" are desired. FIGS. 3a and 3b show a side view and an end view respectively of a knifecarrier 5a having two wing-cutting knives 6', 7' and two knives 24, 25 in two parallel planes transversely on the axis of rotation and each knife having a hook-shaped cutting edge 24a. Guide plates 26 and 27 respectively are arranged between the knives 6' and 24 and 7' and 25 respectively; the inlet and cutting edges of the knives 6' and 7' are designed as described for knives 6.

The opening angle of the cutting edges of the wing cutting knives has an effect on the amount of meat which is cut off the breast of the bird during severing of the wings, for example, a large opening angle has the result that more meat is cut off the breast. Depending on the type of bird to be processed this angle can be optimally chosen; the easy replaceability of the knives makes the device rapidly adaptable to a new situation.

What is claimed is:

1. Device for separating the wings from the trunk of slaughtered poultry, said poultry being suspended by the legs from a conveyor track and being conveyed with the breast forward, comprising:

a rotatably driven common carrier of which the rotating plane coincides with the plane of symmetry of the conveyor;

two non-circular knives oppositely attached to each side of the carrier;

means for positioning the poultry between the knives; and a wing support situated on each side of the carrier cooperating with each knife during the cutting operation.

2. Device according to claim 1, wherein the common carrier further comprises a disc having laterally diverging edge flanges over part of its circumference and the knives having planar surfaces, which are essentially extensions of the edge flanges.

3. Device according to claim 2, in which the wing supports comprise elongate guides which grip around the edge flanges and the ends of which are directed towards one another.

4. Device according to claim 1, in which each knife is provided with two cutting edges having a V-shaped configuration and in which each cutting edge is preceded by a non-cutting inlet edge part.

5. Device according to claim 4, in which the cutting edges are situated in a knife part diverging outwardly from the rotating plane of the carrier.

6. Device according to claim 1 further comprising a stop situated in the central longitudinal plane between the knives.

7. Device according to claim 6, in which the carrier further comprises a control curve and in which the stop is elongate and tiltable about a horizontal axis having one end located under the axis of rotation for cooperating with the control curve.

8. Device according to claim 1, comprising two additional cutting knives situated in an essentially parallel relationship behind the cutting knives, transversely on the axis of rotation, each having a hook-shaped cutting edge, the open part of which is directed in the direction of rotation.

* * * * *